(12) United States Patent
Tzeng

(10) Patent No.: US 9,146,361 B2
(45) Date of Patent: Sep. 29, 2015

(54) CABLE WITH NON-STRIPPING OPTICAL FIBER

(76) Inventor: Shing-Wu Paul Tzeng, Irvine, CA (US)

( * ) Notice: Subject to any disclaimer, the term of this patent is extended or adjusted under 35 U.S.C. 154(b) by 508 days.

(21) Appl. No.: 13/218,751

(22) Filed: Aug. 26, 2011

(65) Prior Publication Data

US 2012/0155815 A1 Jun. 21, 2012

Related U.S. Application Data

(63) Continuation-in-part of application No. 12/971,088, filed on Dec. 17, 2010, now Pat. No. 8,374,474.

(51) Int. Cl.
*G02B 6/44* (2006.01)
*G02B 6/38* (2006.01)
G02B 6/02 (2006.01)
G02B 6/25 (2006.01)

(52) U.S. Cl.
CPC .......... *G02B 6/3833* (2013.01); *G02B 6/02395* (2013.01); *G02B 6/02* (2013.01); *G02B 6/02033* (2013.01); *G02B 6/25* (2013.01); *G02B 6/4402* (2013.01); *G02B 6/4416* (2013.01); *G02B 6/4429* (2013.01); *G02B 6/4484* (2013.01)

(58) Field of Classification Search
CPC .... G02B 6/02; G02B 6/02033; G02B 6/4486; G02B 6/02395
USPC .................................. 385/100–114, 123–128
See application file for complete search history.

(56) References Cited

U.S. PATENT DOCUMENTS

| | | | | |
|---|---|---|---|---|
| 4,243,298 A * | 1/1981 | Kao et al. | | 385/128 |
| 4,441,787 A * | 4/1984 | Lichtenberger | | 385/107 |
| 4,473,599 A * | 9/1984 | Elion | | 65/423 |
| 5,381,504 A | 1/1995 | Novack et al. | | |
| 5,644,670 A * | 7/1997 | Fukuda et al. | | 385/124 |
| RE36,146 E | 3/1999 | Novack et al. | | |
| 5,880,825 A * | 3/1999 | Jakobsen et al. | | 356/73.1 |
| 5,939,136 A * | 8/1999 | Cronk et al. | | 427/163.2 |
| 6,587,628 B1 * | 7/2003 | Walker | | 385/128 |
| 6,974,673 B2 * | 12/2005 | Lockhart | | 435/7.1 |
| 7,272,289 B2 * | 9/2007 | Bickham et al. | | 385/128 |
| 7,379,642 B2 * | 5/2008 | Kachmar | | 385/102 |
| 7,566,474 B2 * | 7/2009 | Kachmar | | 427/163.2 |
| 7,703,990 B1 * | 4/2010 | de Jong et al. | | 385/87 |
| 7,869,677 B2 * | 1/2011 | Kachmar | | 385/102 |
| 8,412,012 B2 * | 4/2013 | Jost et al. | | 385/100 |
| 2002/0038716 A1 * | 4/2002 | Pineda | | 174/68.3 |
| 2003/0099451 A1 * | 5/2003 | Walker et al. | | 385/128 |
| 2003/0150837 A1 * | 8/2003 | Gatica et al. | | 216/83 |
| 2003/0231847 A1 * | 12/2003 | Varner et al. | | 385/127 |
| 2006/0133753 A1 * | 6/2006 | Nelson et al. | | 385/125 |

(Continued)

*Primary Examiner* — Ryan Lepisto

*Assistant Examiner* — Guy Anderson

(74) *Attorney, Agent, or Firm* — Vic Lin; Innovation Capital Law Group, LLP

(57) ABSTRACT

Cables having non-stripping, or buffer-free, optical fibers are disclosed. The cables each have a buffer-free optical fiber including a core, cladding layer and a thin protective coating enclosing the cladding and having an overall diameter of 125 μm. This protective coating protects the cladding and core from moisture and provides structural integrity to prevent physical damage to the fiber during installation and termination with connectors. Embodiments of this non-stripping fiber do not require removal of a buffer layer during field termination so connections can be formed using simple cleaving techniques. As such, the field termination process for embodiments is simplified compared with conventional approaches.

11 Claims, 5 Drawing Sheets

(56) References Cited

U.S. PATENT DOCUMENTS

| | | | |
|---|---|---|---|
| 2006/0159407 A1* | 7/2006 | Kachmar | 385/102 |
| 2007/0031095 A1* | 2/2007 | Fujita et al. | 385/124 |
| 2010/0119202 A1 | 5/2010 | Overton | |
| 2010/0220964 A1* | 9/2010 | de Jong et al. | 385/100 |
| 2010/0220966 A1* | 9/2010 | Bennett | 385/124 |
| 2013/0058613 A1* | 3/2013 | Jost et al. | 385/102 |

\* cited by examiner

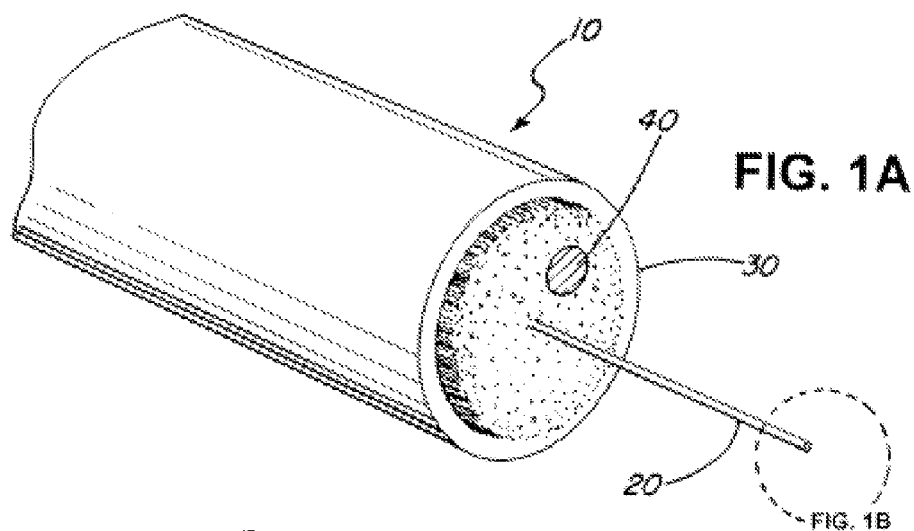
FIG. 1A
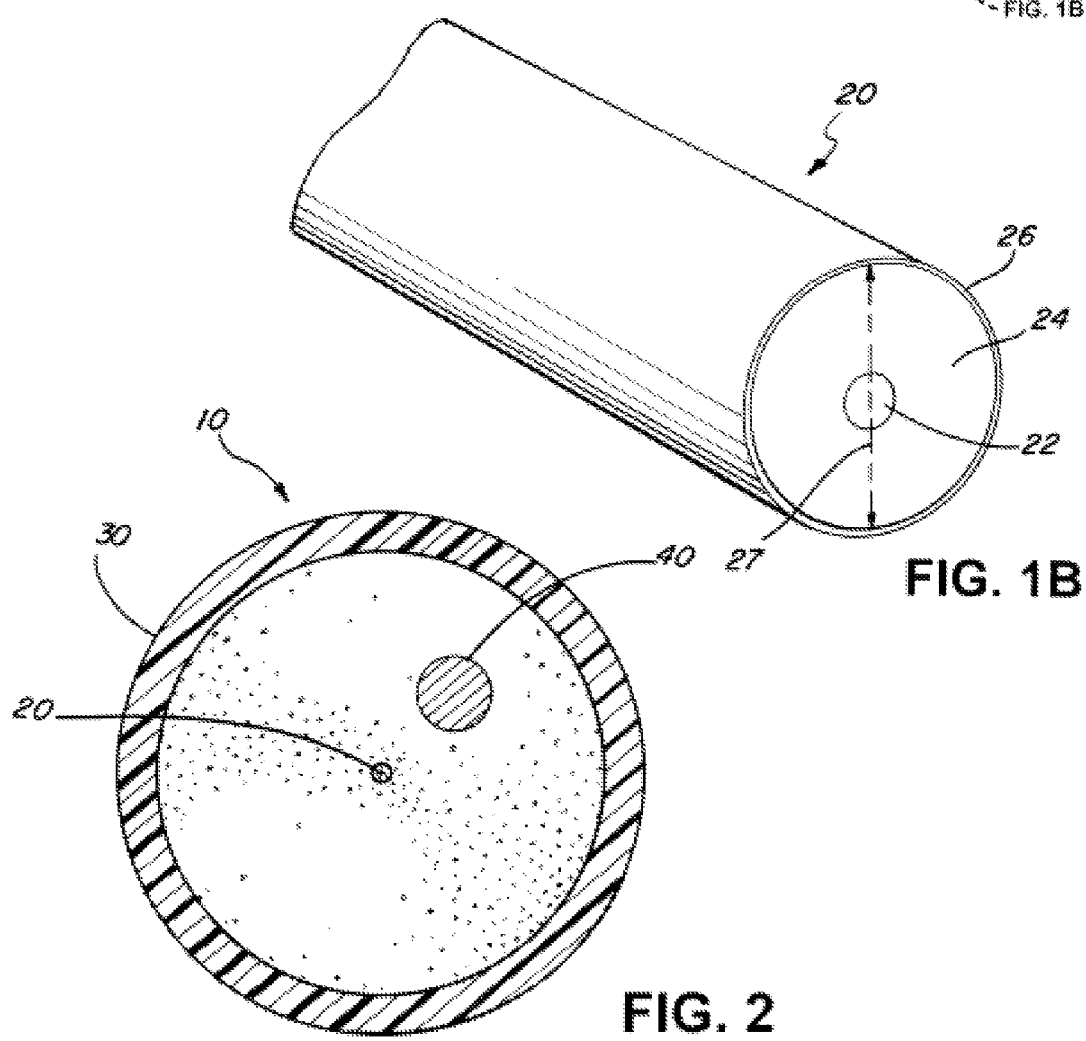
FIG. 1B
FIG. 2

CABLE WITH NON-STRIPPING OPTICAL FIBER

RELATED APPLICATIONS

This application relates to, claims priority from, and incorporates herein by reference, as if fully set forth, U.S. patent application Ser. No. 12/971,088 filed on Dec. 17, 2010 and entitled "OPTICAL FIBER WITH SINGLE LAYER COATING FOR FIELD TERMINATION."

BACKGROUND OF THE INVENTION

1. Field of the Invention

The invention relates generally to optical fibers and cables.

2. Description of Prior Art and Related Information

Conventional optical fibers require field termination when deployed. Field termination is a cumbersome process in that it requires stripping an outer buffer layer typically found on conventional optical fibers and cleaning the stripped surface with alcohol or other solvent to remove any buffer coating and remaining debris. Since the buffer coating is strongly adhered to the glass cladding of a typical optical fiber, stripping this outer buffer layer can prove difficult and time consuming. In addition, this stripping process could potentially damage the optical fiber which may cause system failure.

SUMMARY OF THE INVENTION

In the first aspect, an optical fiber cable is provided. The optical fiber cable has a buffer-free optical fiber comprising a glass core, a cladding layer and a protective coating, the optical fiber defining an outer diameter between 100 to 150 microns and a jacket enclosing the buffer-free optical fiber.

In a first preferred embodiment of the optical fiber cable, the outer diameter of the optical fiber is preferably 125 microns or less. The protective coating preferably comprises a coating thickness in the range of 4 microns to 8 microns. The optical fiber cable preferably further comprises a tensile strength member. The jacket preferably comprises a flat planar backing. The buffer-free fiber cable is preferably configured for field termination where the buffer-free fiber is cleaved without having to strip any portion of the fiber.

In a further aspect, the optical fiber cable has a buffer-free optical fiber comprising a glass core, a cladding layer and a protective coating, the optical fiber defining an outer diameter between 120 to 130 microns. The optical fiber cable has a tensile strength member, such as aramid yarn and a jacket, such as PVC, enclosing the buffer-free optical fiber.

In a second preferred embodiment, the outer diameter of the optical fiber is preferably 125 microns. The protective coating preferably comprises a coating thickness of less than 8 microns. The buffer-free fiber cable in FIG. 1A is installed inside the hollow extrusion comprises a flat planar backing. The buffer-free fiber is preferably configured for field termination where the buffer-free fiber cleaved without having to strip or cleanse any portion of the fiber.

In a further aspect, a method for terminating an optical fiber in the field without stripping is provided. The method comprises isolating a buffer-free optical fiber within a cable, the buffer-free optical fiber comprising a glass core, a cladding layer and a protective coating, the optical fiber defining an outer diameter less than 150 micron. The method further comprises cleaving the buffer-free optical fiber without requiring any stripping and connecting the cleaved buffer-free fiber to a fiber connector.

In a third preferred embodiment, isolating the buffer-free optical fiber preferably comprises isolating the buffer-free optical fiber from tensile members included in the cable. Connecting the cleaved buffer-free fiber to the fiber connector preferably comprises connecting the cleaved buffer-free fiber to the fiber connector without any prior cleansing. Isolating the buffer-free fiber within the cable preferably comprises isolating the buffer-free cable enclosed within a co-axial cable. Isolating the buffer-free fiber within the cable preferably comprises isolating the buffer-free cable enclosed within a hybrid structure cable. Isolating the buffer-free fiber within the cable preferably comprises isolating the buffer-free cable enclosed within the cable having a planar backing.

In accordance with the present invention, structures and associated methods are disclosed which address these needs and overcome the deficiencies of the prior art.

DESCRIPTION OF THE DRAWINGS

FIGS. 1A and 1B are cutaway perspective views of a first preferred embodiment of a fiber optic cable.

FIG. 2 is an end plan view of a non-stripping fiber within a fiber cable jacket.

Figure 3:
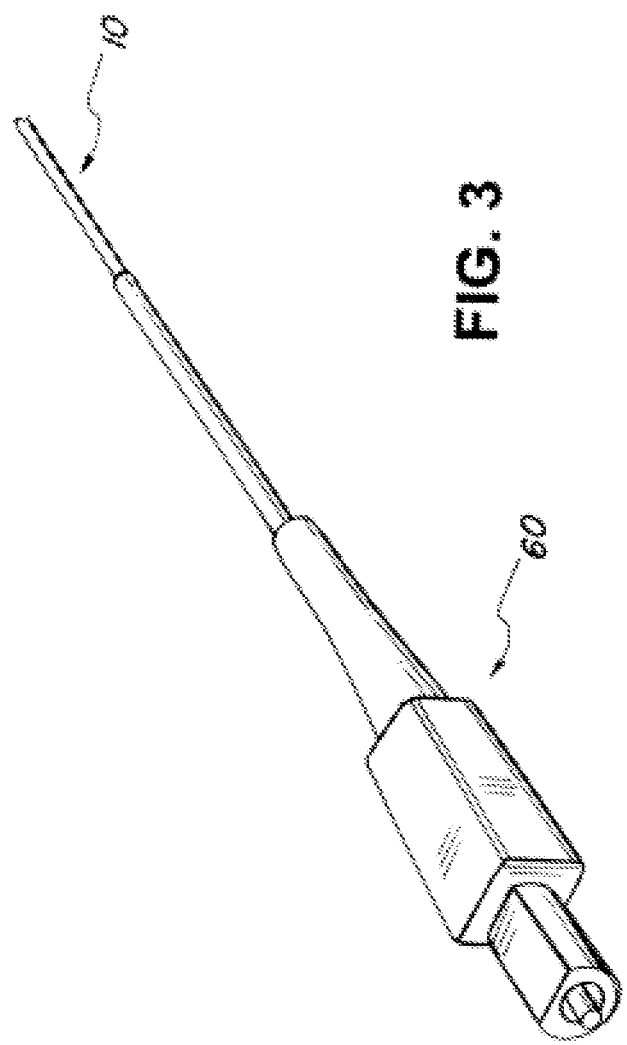
FIG. 3 is an exploded view of the first preferred cable terminated with a connector.

The invention and its various embodiments can now be better understood by turning to the following detailed description wherein illustrated embodiments are described. It is to be expressly understood that the illustrated embodiments are set forth as examples and not by way of limitations on the invention as ultimately defined in the claims.

DETAILED DESCRIPTION OF THE PREFERRED EMBODIMENTS

The following preferred embodiments are directed to cables having a non-stripping, or buffer-free, optical fiber. Such cables may be employed in high-speed video and data systems. Throughout this the specification, the terms "non-stripping" or "buffer-free" refer to an optical fiber which need not be stripped of a buffer layer in order to be terminated in the field for connection to an optical connector.

A first preferred embodiment of a fiber optic cable is illustrated in FIG. 1A and is designated generally by the reference numeral 10. The cable 10 comprises a buffer-free fiber 20 enclosed in a jacket 30. The buffer-free fiber 20 comprises an inner glass core layer 22, a cladding layer 24 disposed over the core layer 22 and an outer protective coating 26.

The core layer 22 has a preferred outer diameter in the range of 9 μm to 62.5 μm. The cladding layer has a preferred diameter 27 in the range of 100 μm to 115 μm. Therefore, room is provided for a uniquely thin outer coating 26 while keeping the entire outer diameter of the fiber to approximately 125 microns. This outer diameter 27 of the non-stripping, coated fiber is approximately equal to the typical 125-micron outer diameter of glass cladding layer in the prior art, i.e., a conventional fiber having its buffer layer stripped to expose the cladding layer surrounding a glass core.

By contrast, a conventional optical fiber which has a diameter of 250 μm includes the buffer layer outside of the 125 μm of glass cladding layer. The conventional buffer layer of the prior art serves two purposes. One purpose is to protect the glass layer from moisture. The other purpose is to protect the glass cladding and core during the manufacture and terminations of the optical fiber.

Preferred embodiments are disclosed herein which have protective layers that comprise the same moisture protection as exhibited by the buffer layer associated with the prior art. The protective layer of the buffer-free fiber protects the glass cladding and core during the optical fiber manufacturing process as well as termination in the field.

The outer coating 26 preferably comprises a polymeric material and defines a preferred thickness in the range of 4 microns to 8 microns. The thickness of the outer coating 26 is substantially thinner than a conventional bare fiber having a buffer layer with a total thickness at 250 microns. By applying this super thin polymeric protective coating permanently to the cladding layer, it will be appreciated that a standalone fiber is provided at generally 125 microns without a buffer layer. Therefore, the absence of the buffer layer makes this fiber 20 according to the preferred embodiment ready for termination and insertion into a standard fiber connector without need for stripping.

The outer coating 26 protects the cladding 24 from moisture and protects the cladding 24 from damage when the buffer free fiber 20 is clamped during a cleaving process. The outer coating 26 may be a polymer material such as UV-cured urethane acrylate composite materials. The thermal expansion coefficient of the outer coating 26 preferably matches that of the glass of the cladding layer 24.

As depicted in FIGS. 1A and 2, the cable 10 may include one or more elongated members 40 for tensile strength. In the preferred embodiment, this elongate tensile strength member 40 may comprise aramid yarn.

FIG. 3 illustrates the first preferred cable 10 having a non-stripping fiber being terminated for connection to a fiber optic connector 50. Unlike conventional optical fibers which must be stripped in the field so as to remove the outer buffer layer, the preferred optical fiber 20 according to the invention requires no stripping. Therefore, the preferred optical fiber 20 also obviates the need to cleanse the fiber with alcohol since there will be no debris to remove. Accordingly, the preparation for field termination process requires only the step of cleaving the fiber with a fiber cleaver according to the cleave specification.

Figure 4:
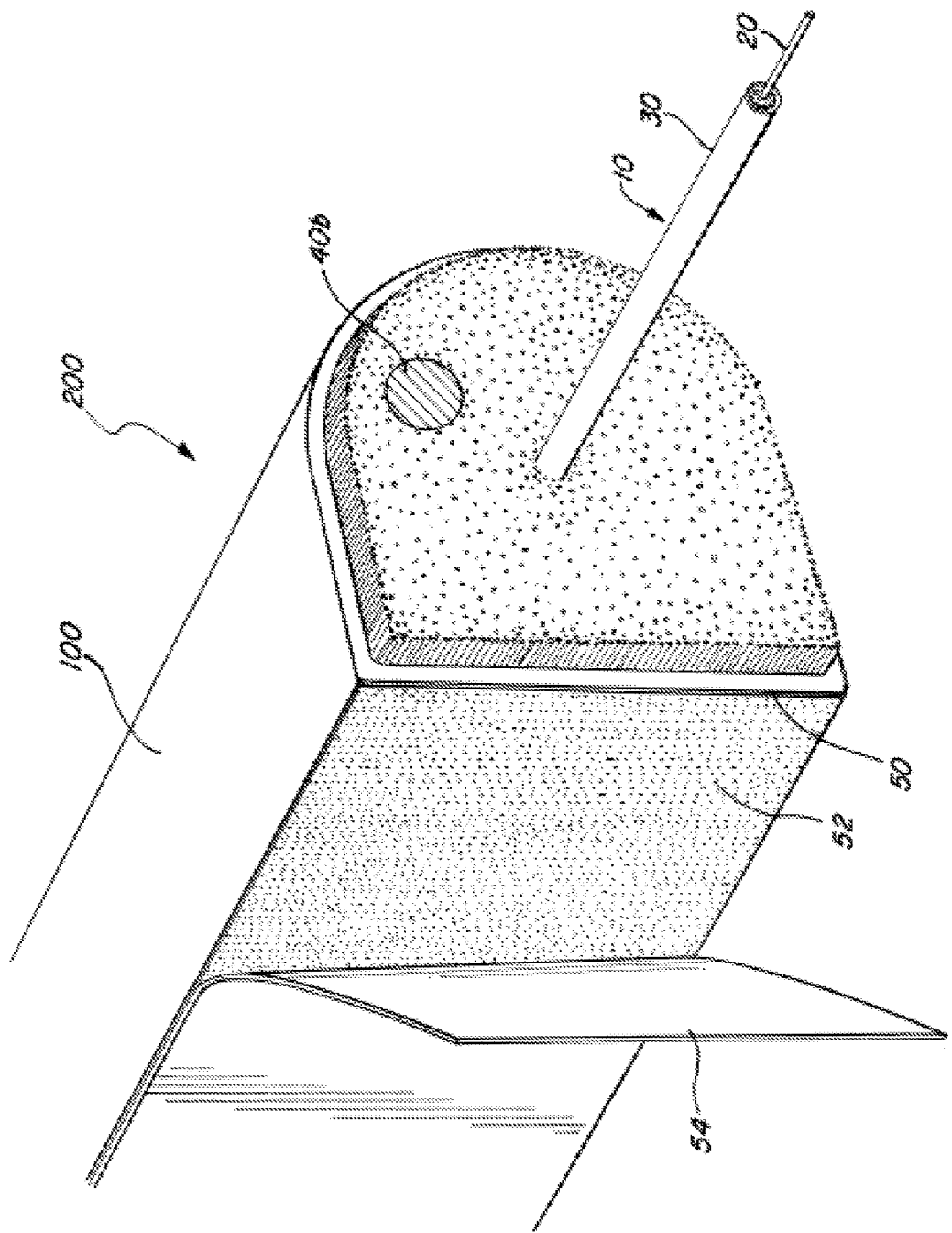
FIG. 4 is a perspective view of a preferred embodiment wherein the fiber optic cable of FIG. 1A is disposed within a conduit having a planar backing.

In FIG. 4, the preferred cable 10 of FIG. 1A may be disposed within a conduit 100 to form a cable assembly 200. In FIG. 4, elements of similar structure and/or function are designated by the same reference numerals followed by the letter "b." The conduit 100 thus houses the cable 10, including the jacket 30, fiber 20, tensile member 40 and any other internal components within the cable 10. In the preferred cable assembly 200, the outer conduit or jacket 100 comprises a planar backing 50 configured for abutting or adhering to a generally flat surface such as a wall or countertop. The conduit 100 may comprise an adhesive material on an outer surface 52 of the backing 50 which may be covered by a removable liner 54.

Figure 5:
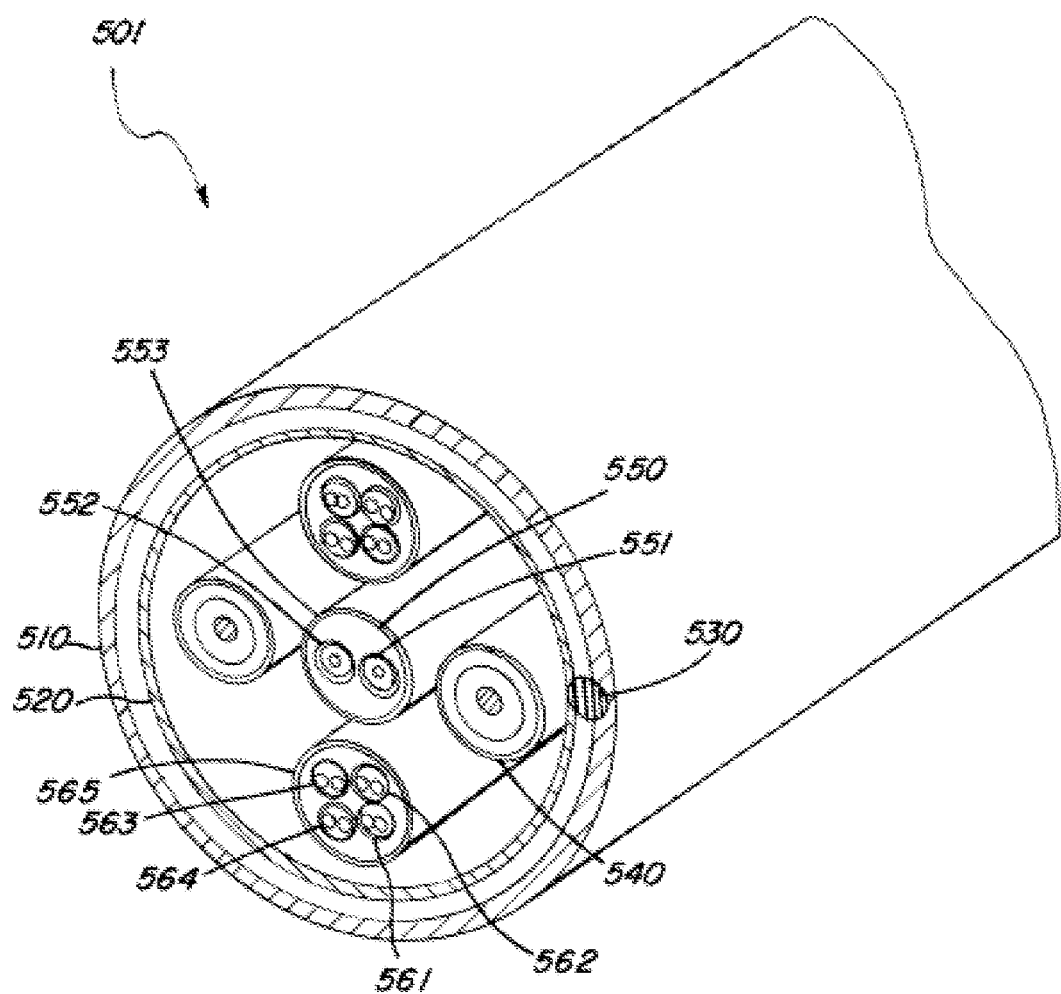
FIG. 5 is a perspective view of a buffer-free fiber within a hybrid structure cable which possibly comprises of electrical wires and optical fiber. The electrical wires in the hybrid structure cable could comprise of power wires, cat 5 type data wires, coaxial wires and component wires.

FIG. 5 is a perspective view of a hybrid structure cable 501 comprising the buffer-free fiber cable 551 and one or more electrical wires. The electrical wires in the hybrid structure cable 501 may comprise power wires, category 5/6/7 data wires, and component wires exemplified by copper cabling 561-564. The hybrid structure cable 501 may have one or more coaxial cables 540 and a rip cord 530.

In an embodiment, the hybrid structure cable 501 may have a second buffer-free fiber 552 which may be enclosed by a protective skin 553. Copper cables 561-564 may also be enclosed by a protective skin 565. Jacket 510 encloses all of the electrical and optical connections.

Figure 6:
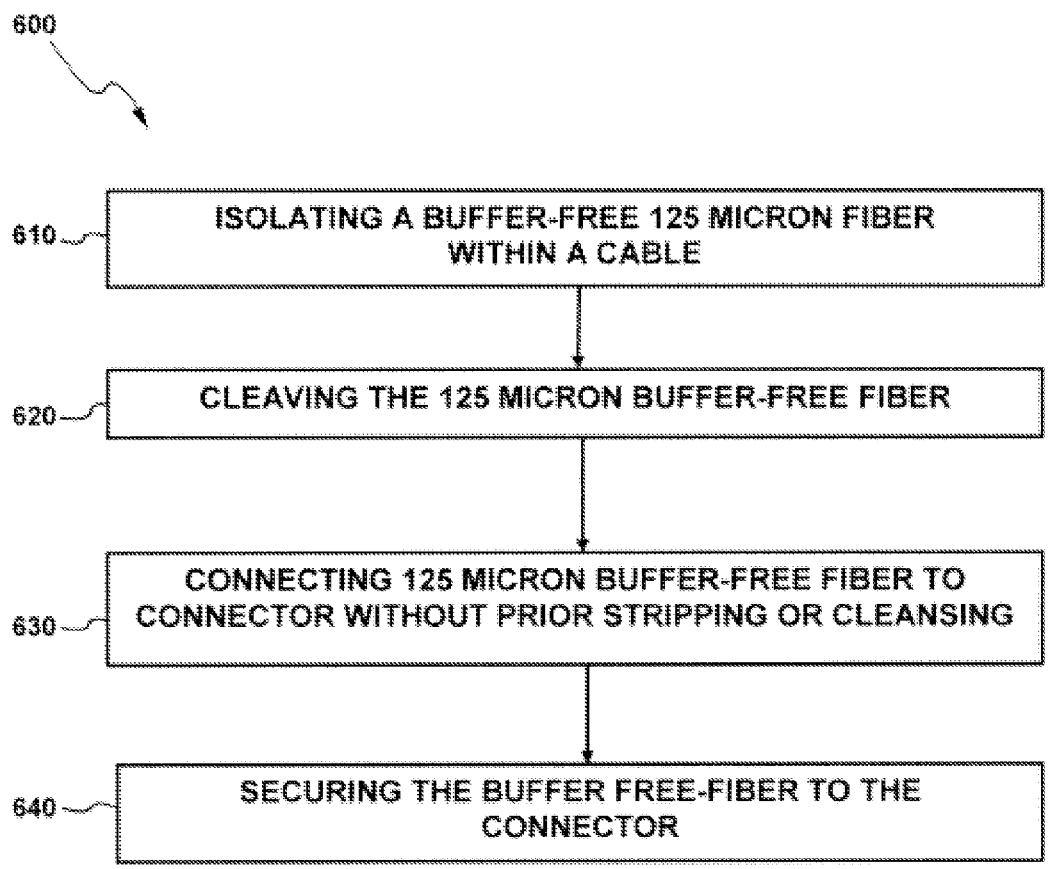
FIG. 6 is a flow chart diagram of a preferred method for terminating a fiber optic cable without stripping any portion of the optical fiber.

FIG. 6 illustrates a preferred non-stripping method 600 of terminating an optical fiber. The method 600 comprises the step 610 of isolating a buffer-free 125 micron fiber within a jacket of a cable. In step 620, the 125 micron fiber is cleaved according to cleave specifications without any stripping. In step 630, the cleaved fiber is inserted into the connector without any prior stripping or cleansing. In step 640, the buffer-free fiber is secured to the connector.

The process for manufacturing the cable incorporating the 125 μm diameter buffer-free fiber 20 differs from that for manufacturing a conventional 250 μm diameter fiber having a buffer in several key aspects. First, the spacing of guiding wheels is changed to accommodate the thinner buffer-free fibers 20.

Second, the rotational speed of the guiding wheels must be adjusted to maintain the same advancing linear speed. Third, because of the thinner coating of the outer coating 26, the guiding wheels must be cleaned to prevent dust particles from damaging the cladding 24 which is made from glass.

It will be appreciated that the preferred cables above each have a buffer-free optical fiber having a core, cladding layer and a thin protective coating enclosing the cladding, all with an overall diameter of 125 μm. This protective coating protects the cladding layer and core from moisture and provides structural integrity to prevent physical damage to the fiber during installation and termination with connectors. The unique cables disclosed herein include the preferred buffer-free fibers which obviate the need for stripping required for conventional 250 μm optical fibers which employ a buffer layer to protect the cladding and glass, and thus require removal of the buffer layer and cleansing of the exposed cladding layer in order to form a connection during field termination. Embodiments of the buffer-free fiber do not require removal of a buffer layer during field termination and connections can be formed using simple cleaving techniques. As such, the field termination process for embodiments is simplified compared with conventional approaches.

In another aspect, cables having the buffer-free optical fiber may include tensile strength members to provide additional structural strength. Hybrid cables having power and data wires and coaxial cables may also employ a buffer-free optical fiber.

Many alterations and modifications may be made by those having ordinary skill in the art without departing from the spirit and scope of the invention. Therefore, it must be understood that the illustrated embodiments have been set forth only for the purposes of examples and that they should not be taken as limiting the invention as defined by the following claims. For example, notwithstanding the fact that the elements of a claim are set forth below in a certain combination, it must be expressly understood that the invention includes other combinations of fewer, more or different ones of the disclosed elements.

The words used in this specification to describe the invention and its various embodiments are to be understood not only in the sense of their commonly defined meanings, but to include by special definition in this specification the generic structure, material or acts of which they represent a single species.

The definitions of the words or elements of the following claims are, therefore, defined in this specification to not only include the combination of elements which are literally set forth. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a sub-combination or variation of a sub-combination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptually equivalent, what can be obviously substituted and also what incorporates the essential idea of the invention.

The invention claimed is:

1. An optical fiber cable, comprising;
   a buffer-free optical fiber comprising a glass core, a cladding layer and a protective coating forming an outermost layer of the buffer-free optical fiber, the buffer-free optical fiber defining an outer diameter between 100 to 150 microns, the protective coating comprising moisture-resistant polymeric material having a coating thickness in the range of 4 to 8 microns; and
   a jacket enclosing the buffer-free optical fiber.

2. The cable of claim 1, wherein the outer diameter of the optical fiber is 125 microns or less.

3. The cable of claim 1, further comprising a tensile strength member.

4. The cable of claim 1, further comprising a conduit housing the jacket and the buffer-free optical fiber.

5. The cable of claim 4, wherein the conduit comprises a flat planar backing.

6. The cable of claim 1, wherein the buffer-free fiber is configured for field termination without requiring stripping.

7. An optical fiber cable, comprising;
   a buffer-free optical fiber comprising a glass core, a cladding layer and a protective coating forming an outermost layer of the buffer-free optical fiber, the buffer-free optical fiber defining an outer diameter between 120 to 130 microns, the protective coating comprising moisture-resistant polymeric material having a coating thickness in the range of 4 to 8 microns;
   a tensile strength member; and
   a jacket enclosing the buffer-free optical fiber.

8. The cable of claim 7, wherein the outer diameter of the optical fiber is 125 microns.

9. The cable of claim 7, further comprising a conduit housing the buffer-free optical fiber, the tensile strength member and the jacket.

10. The cable of claim 9, wherein the conduit comprises a flat planar backing.

11. The cable of claim 7, wherein the buffer-free fiber is configured for field termination without requiring stripping.

* * * * *